W. J. LARSON.
FISH TRAP.
APPLICATION FILED AUG. 26, 1916.

1,230,585.

Patented June 19, 1917.
6 SHEETS—SHEET 2.

Inventor
W. J. Larson.
By Henry L. Reynolds
Attorney.

UNITED STATES PATENT OFFICE.

WALTER J. LARSON, OF WRANGELL, TERRITORY OF ALASKA.

FISH-TRAP.

1,230,585.  Specification of Letters Patent.  Patented June 19, 1917.

Application filed August 26, 1916. Serial No. 116,956.

*To all whom it may concern:*

Be it known that I, WALTER J. LARSON, citizen of the United States, and resident of Wrangell, Territory of Alaska, have invented certain new and useful Improvements in Fish-Traps, of which the following is a specification.

My invention relates to fish traps, and more particularly, to floating fish traps which are to be used in open waters.

One object of my invention is to provide means, in such a trap, of positively distending and holding distended, the vertical webs of the trap, and to prevent their being displaced by currents or rough water to which they may be subjected.

Another object is to provide a trap of such form that two spillers may be used, and may be operated entirely independent of each other and of the pot.

Another object is to provide easily adjustable means for the escape of fish during such periods as it is not desired to operate the trap, on Sundays, for instance, when by law it is required that the traps be not operated.

Another object of my invention is to provide means for anchoring a floating trap which will hold it securely in position, and will, at the same time, produce a minimum of strain upon the parts of the trap.

Another object of my invention is to provide means for holding the web of the leads distended and vertical, without the use of heavy weights thereon.

A still further object is to produce a floating fish trap of a strong, compact character, such as will not easily be broken up by storms to which it may be subjected.

Other objects and advantages will appear as the description progresses.

In the drawings I have shown my invention in the form now preferred by me.

Figure 1:
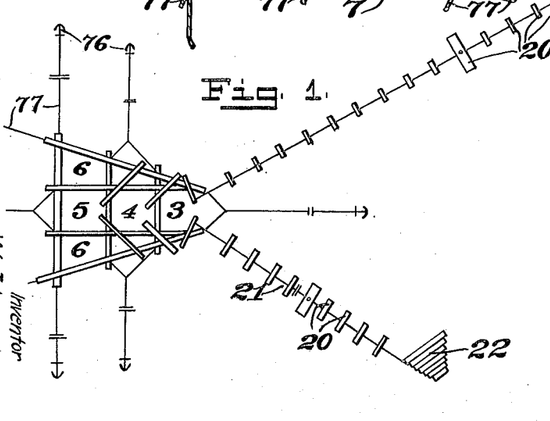
Figure 1 is a general plan view of the trap and leads.
Figure 2:
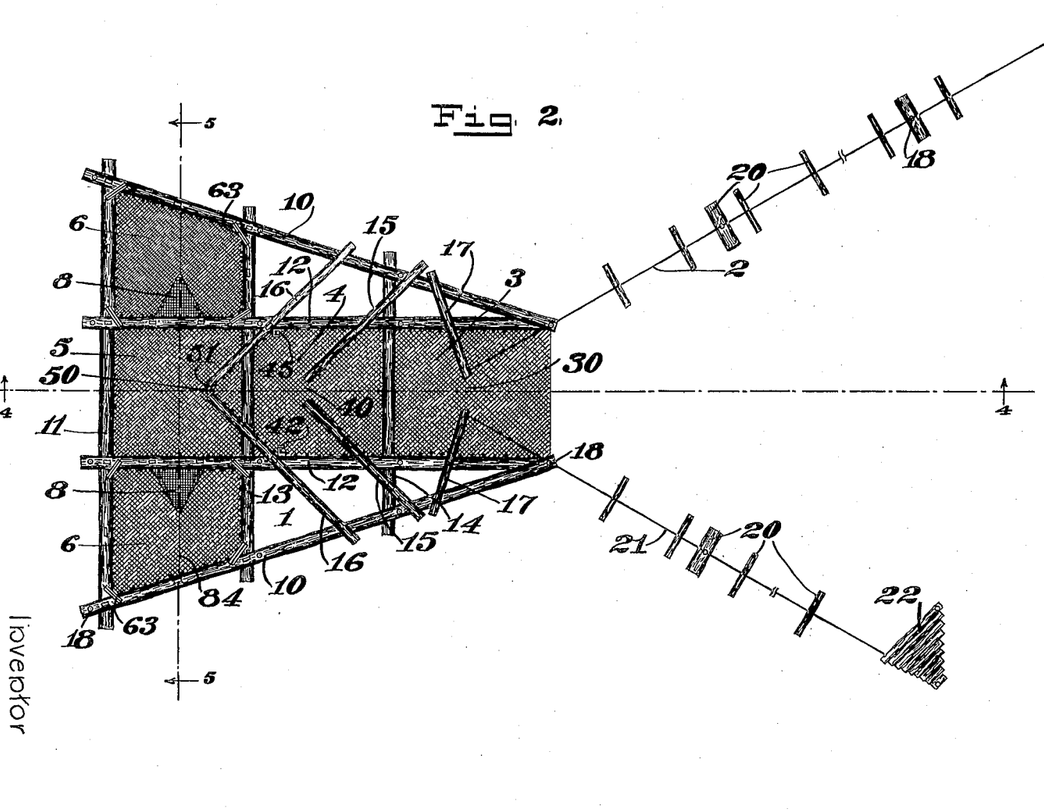
Fig. 2 is a plan view of the trap and leads, showing the different compartments.
Figure 3:
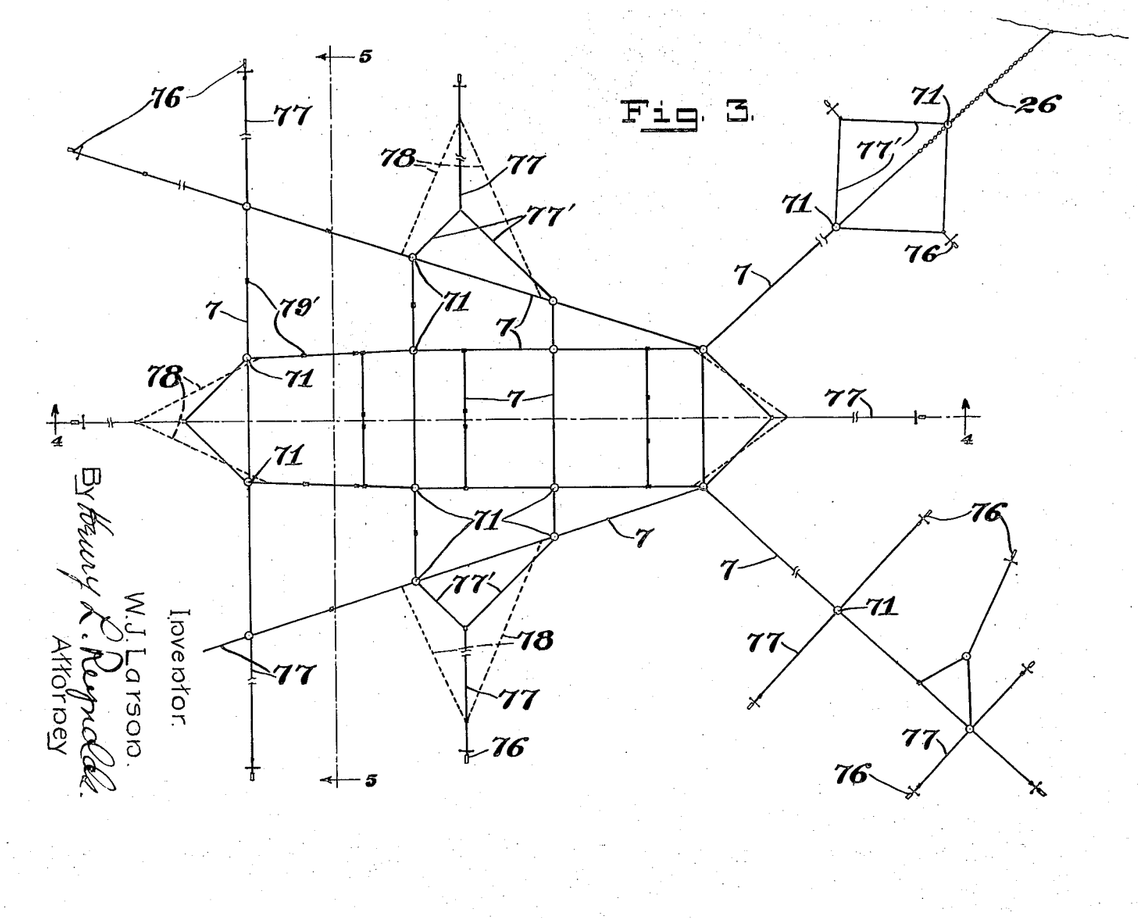
Fig. 3 is a plan view of the lower frame cables and of the anchoring plan.
Figure 16:
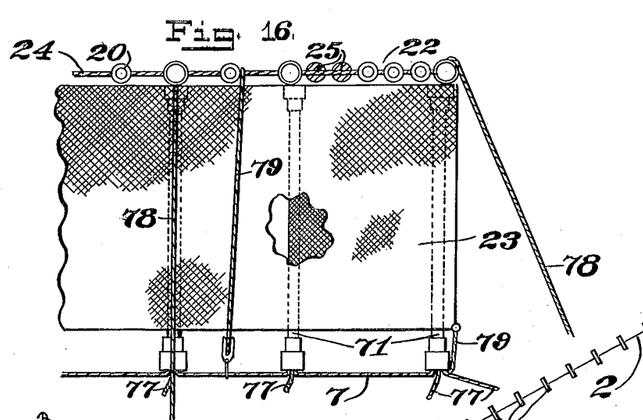
Fig. 16 is a side elevation of the jigger at the end of a lead.

My invention comprises a float 1, built of logs or of any other suitable material, and containing various trap compartments, as the big heart 3, the little heart 4, the pot 5, and the spillers 6. Leading outward from the mouth 30 of the trap is a shore lead 2, which is carried by a series of floats 20, and preferably, extends to or near the shore. In addition to this shore lead, I prefer to employ a second or stream lead 21, extending from the mouth and diverging from the shore lead 2. This stream lead is similarly supported by floats 20, and has a raft 22 at its outer end. This raft is formed, preferably, of logs laid side by side, as shown in Figs. 1 and 16. The raft 22 has a jigger 23 shown in detail in Fig. 16, depending therefrom, adapted to turn back the fish which may follow the lead the wrong way.

The leads 2 and 21 are, preferably, supported on cables 24. These cables, instead of passing over or about the floats 20, and the logs comprising the raft 22, are, preferably, passed through holes 25 therein, as shown in Fig. 16. This prevents excessive chafing, and prevents also the breaking loose of the floats.

In my preferred form the float 1 is built up of logs arranged in a general triangular shape, this arrangement making for greater strength. Two side logs 10 are secured at opposite ends of the base log 11. At the apex these logs are preferably spread apart somewhat to form the mouth of the trap.

Two parallel logs 12 are secured, one to the free end of each side log 10. These logs extend to the base log 11, and are secured thereto. Transverse logs 13 and 14 may be secured to the logs 12 and 10.

Brace logs 15 and 16, preferably extend inward, toward the center of the trap, and inclined toward the base log 11. These form the supports for the web which forms the outer or front walls of the two hearts. The inner ends of these logs may be separated to correspond with the separation of the netting to form respectively the big heart tunnel and the little heart tunnel. A pair of brace logs 17 may extend in the opposite direction, to support the ends of the web forming the entrance tunnel. It is to be understood that I do not confine myself to the particular construction described, nor to the use of logs in the construction of the float. These are details which may be varied to suit conditions.

One of the greatest difficulties experienced in the operation of floating traps, is the difficulty of keeping the webs distended and vertical, both in the trap proper and in the leads. In the common type of fish traps the netting is secured to piles which are driven into the sea bottom, and the bottom edges are further held down by weights. In floating traps weights alone have been relied upon for this purpose. Where currents are strong the web is swung laterally at such an angle that they turn the fish downward and they escape beneath the netting.

To prevent this I have provided means for positively holding the web distended and vertical at all times and under all conditions of current. The web may be raised for inspection or repairs, and again lowered to its proper position, where it will stay. Extended below the float 1, adjacent the lower edge of the netting walls, and preferably following the outlines thereof, I provide a cable or cables 7. These cables 7 may be supported from the float by suspending cables 70 and in part by the web, as will now be described.

Figure 4:
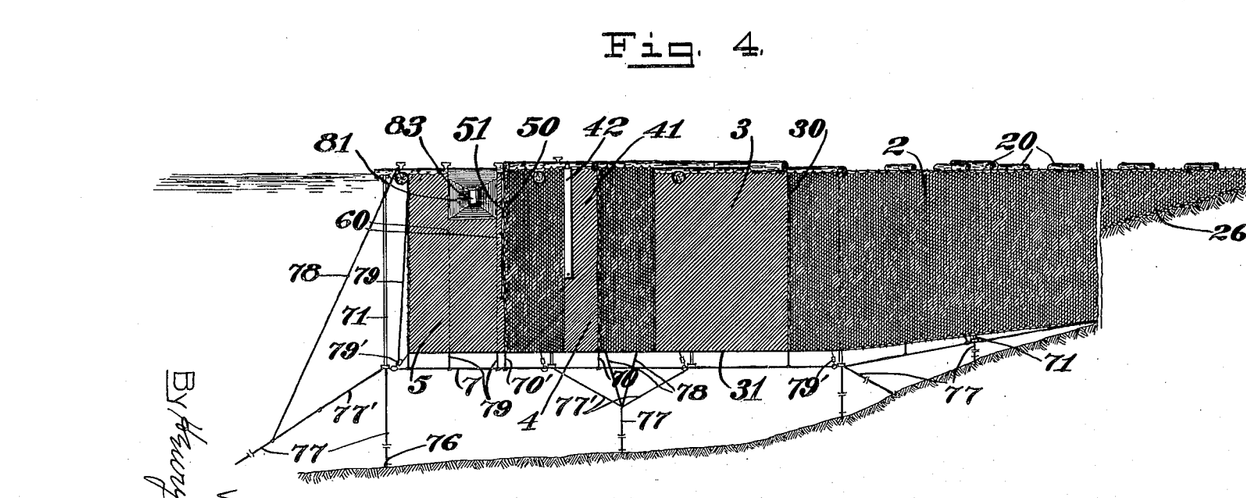
Fig. 4 is a section on line 4—4 of Fig. 2.
Figure 5:
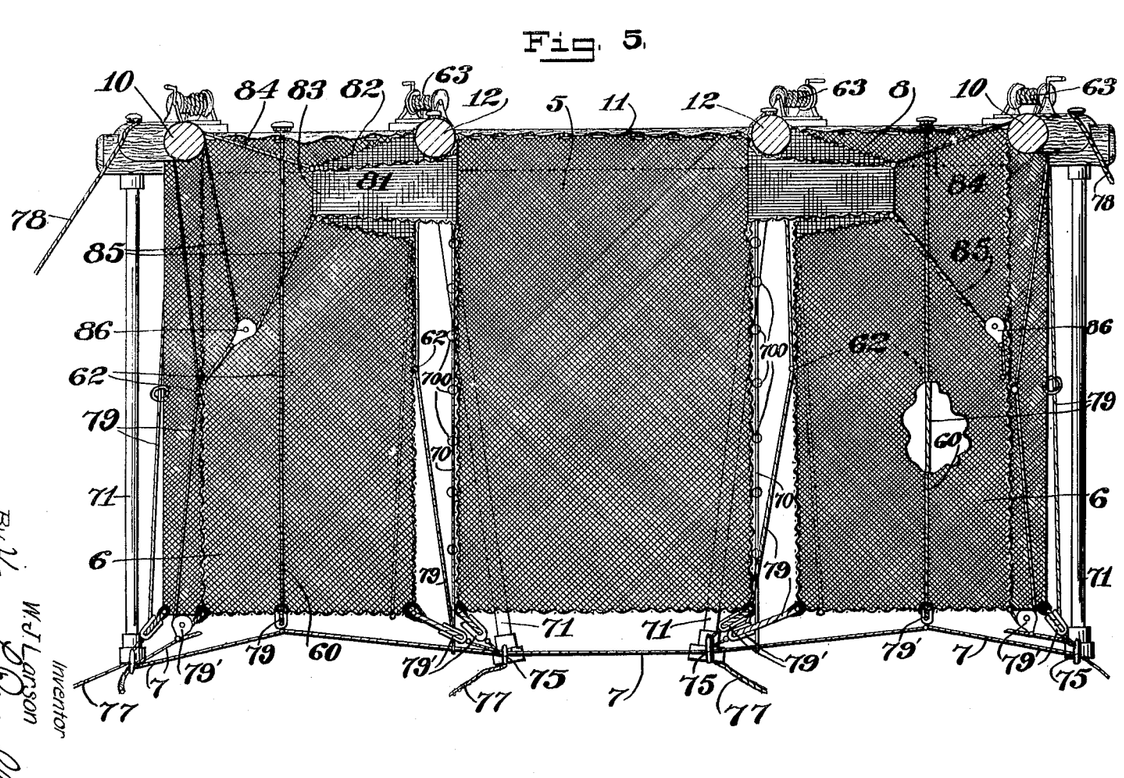
Fig. 5 is a section on line 5—5 of Fig. 2.

The web may be mounted to be raised and lowered on the suspending cables 70 by means of rings 700, as shown in Figs. 4 and 5, or in any other suitable manner. Pulleys 79' are secured to the cable 7, and downhaul lines 79 are secured to the lower edge of the web, and pass through the pulleys 79' and then up to the float.

To space the cable 7 from the float, I may employ posts or spreader pipes 71. These spreaders are preferably made up of two pipes 71 and 72, one within the other. Flanged fittings 73 are secured upon the ends of outer pipe 71, and bear upon the ends of inner pipe 72. The flanged fittings have holes registering with the holes through the inner pipe 72. The fitting on the upper end of the spreader is preferably mounted in a socket 100 formed in the under side of one of the frame logs.

A line 74 extends through the inner pipe 72 and through a hole 101 in the log registering therewith. It is secured at its upper end to the log by means of a clamp 18, or by any other suitable means. This clamp, as shown, comprises a ring 181, through which pass U-bolts 182. The rope passes through the U-bolt and is drawn up against the ring by means of nuts 183 on the ends of the U-bolts. A ring 75 may be secured upon the lower end of the line 74, near the fitting 73, and the cable 7 passes through this ring. The cable 7 is thus secured to and spaced from the float 1.

Figures 8, 9, 10, 11, 12, 13, 14, 15:
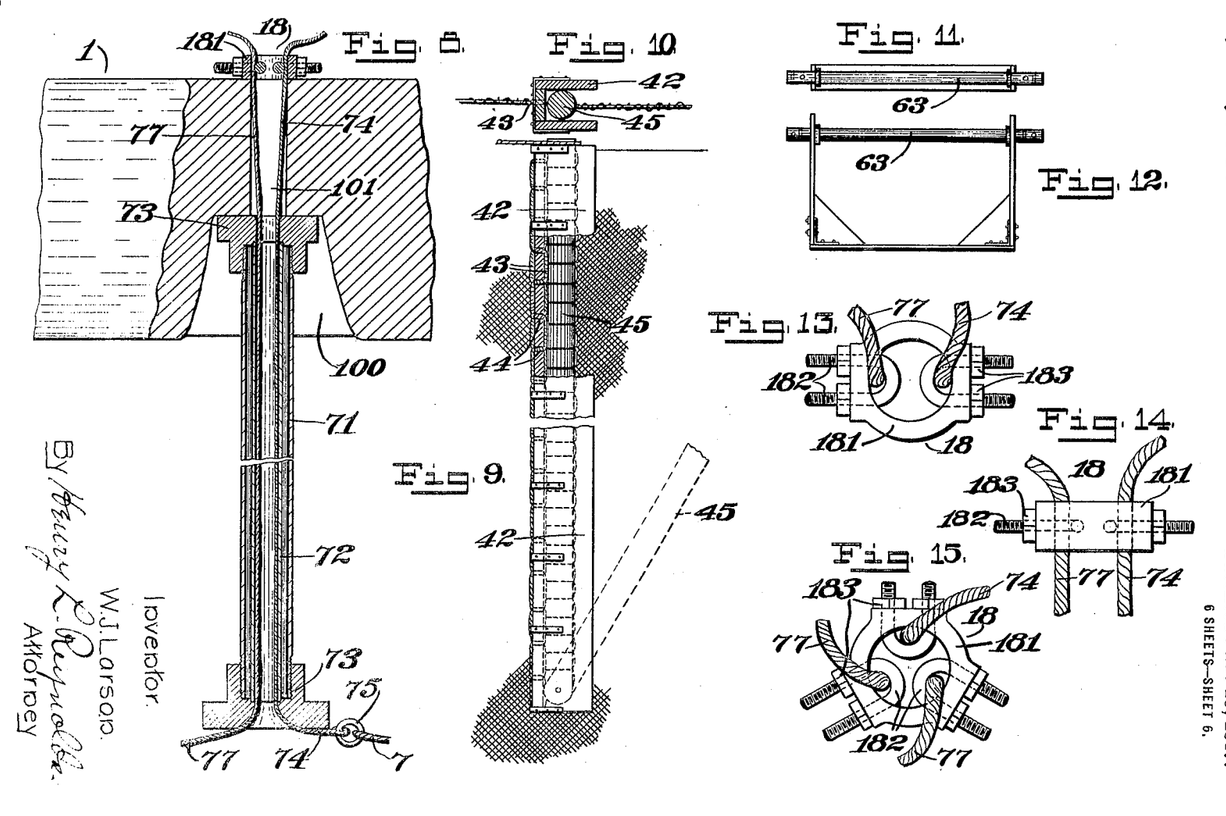
Fig. 8 is a section through one of the logs, a spreader pipe, and a clamp.
Fig. 9 is a side elevation, partly in section, of one of the Sunday gates opening from the heart to the outside, its open position being indicated by dotted lines.
Fig. 10 is a section through this Sunday gate.
Fig. 11 is a plan view of a windlass which may be employed to raise the spillers.
Fig. 12 is a front elevation of the windlass.
Fig. 13 is a top plan view of a double clamp for use in holding the anchoring lines.
Fig. 14 is a side elevation of the clamp.
Fig. 15 is a plan view of a triple clamp.

The struts or posts just described serve to hold the web distended. To secure it in vertical position, and also to secure the float and leads in the proper position, I may employ a series of anchors 76. Anchoring lines 77 extend from the anchors toward the trap and are connected thereto either directly or through the means of bridles 77'. The connection with the lower edge of the trap is by passing the lines 77 or 77', as the case may be, upward through the pipes 71, and securing them to the floats, as is shown in Figs. 4, 5 and 8. The bridles 77' may connect one anchor line 77 with two points at the bottom edge of the trap. In cases where such bridles are not used the anchor line 77 extends upward through the pipes 72.

A second series of bridles 78 are secured to the anchor lines 77, and extend upward to the float, as shown in Figs. 4 and 5, where they are wrapped about the junctions of two of the frame logs, or secured in any suitable manner. The web of both the trap proper and the leads is thus anchored, at top and bottom; and, what is of equal importance, it is held vertical and fully distended. On the shore lead, where the depth of water is less than the depth of the lead, the latter may taper off. Upon such sections as may contact with the bottom, I prefer to place a chain 26 along the bottom edge of the web. This will save wear upon the web, and will assist in holding it down.

In order to secure greater stiffness, I prefer to employ two pipes in the construction of my spreaders, one within the other. Commercial lengths of pipes used to form these struts 71 and 72 may not be long enough to reach the entire distance, in which case the joints for the respective pipes are preferably placed at different levels. The fittings are placed on the ends of the pipes to prevent them from splitting, due to the action of the cables thereon, and to give a larger bearing surface against the float. The surfaces where the cables bear on the fittings may be rounded off, as shown in Fig. 8, to prevent undue chafing. It will be noted that by the use of such a construction as the one described there is no bending strain on the pipes, due to an attachment of the webs or anchor lines thereto. All the strain on the pipes is an end thrust, and does not tend to bend them.

The big heart 3, the little heart 4, and the pot 5 are arranged in the ordinary manner. They have the entrance tunnel 30, the big heart tunnel 40, and the little heart tunnel 50, respectively, formed by jigger walls, which act to turn back the fish when once it is within the trap. The webs forming these compartments are preferably adapted to be raised or lowered at will, and are guided upon the suspension ropes 70 by rings 700, or in any suitable way. A web 31 extends over the bottom of the big and little hearts and the pot. The spillers 6 are preferably two in number, and, as shown, are arranged one at each side of the pot. Tunnels 8 form the communication between the pot and the spillers.

As the law provides a closed season on Sunday, some arrangement must be made to close the trap to the fish. If it is only closed at the mouth, as at 30, the fish will still be penned in by the leads. To prevent the trapping of fish I provide a gate 51, which is preferably placed to close off the pot 5 from the little heart 4, and a pair of gates 41, in the side walls of the little heart. It is, of course, evident that these gates may be placed to close off the little heart from the big heart, and to provide openings in the side walls of the big heart, or in any other suitable place.

Figure 6:
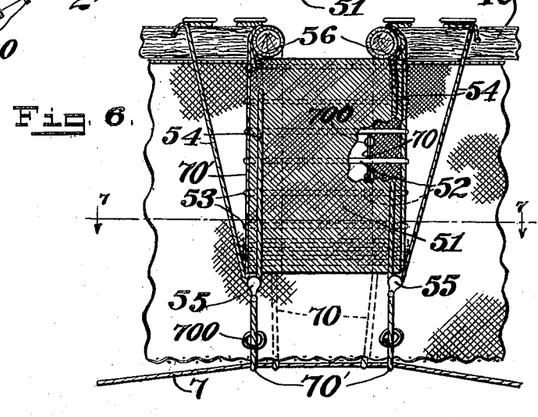
Fig. 6 is a front elevation of the Sunday gate which closes off the pot from the heart, in closed position.
Figure 7:
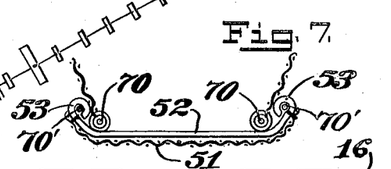
Fig. 7 is a section through the Sunday gate on line 7—7 of Fig. 6.

The gate 51 is shown in detail in Figs. 6 and 7. A fabric or section of net 51 is mounted upon ribs 52, having rings 53 formed upon their ends. These ribs are bent about the suspension cables 70, and the rings 53 are guided on cables 70', as shown in Fig. 7. A downhaul rope 54 is secured to the upper end of the gate, and passes through a pulley 55 and up to the float, where it may be secured. An uphaul rope 56 is also secured to the upper end of the gate, and passes upward to the frame log 16, where it may be secured. The uphaul rope 56 and the downhaul rope 54 may be one rope, or they may be joined at their ends.

The web forming the wall of the little heart is slit from the top downward to form the gate 41. A trough 42 is secured to the vertical edge at one side of the slit. As shown in Figs. 9 and 10, ropes 43 are woven in and out of holes 44 in the bottom of the trough, and the web is secured to this rope 43. Any suitable form of fastening may be employed. Pivoted in one end of the trough, preferably the lower end, is a post 45, to which is secured the other edge of the slit. This post has but little, if any, excess buoyance. When, therefore, its upper end is released, it will tend to sink, and the gate will be opened, as shown by the dotted lines in Fig. 9.

When the time comes for closing the trap, the gate 51 is raised, and the gates 41 opened. The fish which enter the trap cannot pass into the pot, but can escape to the open water on either side of the trap through the gates 41.

The spillers 6 are made of webbing which is entirely separated from the webbing forming the pot and hearts. Either one may thus be raised without disturbing the other spiller or the rest of the trap. The downhaul ropes 79 are secured to the bottom edge of the web, at the corners and at other suitable places. I prefer to reinforce the web at such points by a line 60 secured in the webbing, and extending from top to bottom of the spiller. The end of the downhaul line 79, and of the uphaul line 61 may be attached to the lower end of this reinforcing line 60. Windlasses 63 may be used to raise the spiller, if so desired.

The spiller is preferably not mounted to slide upon guide cables, as are the other compartments. It is supported only from the cable 7 at the bottom. To spread the wall between the upper and lower edges, I place rings 62 upon the reinforcing lines 60, and pass the upwardly extending run of the downhaul line 79 through this ring. As the downhaul line is hauled taut, the web is stretched between the top and bottom edges, and is held outward between these points.

The tunnel 8 between the pot and spiller is made up of a pot tunnel 81 and a spiller tunnel 82, the first within the second. These tunnels are preferably in the form of rectangular pyramids, with a small opening 83 at the apex for the entrance of the fish. The spiller tunnel 82 is secured in the spiller webbing, and to the frame upon the spiller side of the log 12. The pot tunnel 81 is secured to the webbing of the pot and to the log 12 upon the pot side thereof. The pot tunnel extends within the spiller tunnel until their edges meet to form the entrance opening 83, where they are secured together. The sides of this entrance may be spread in any suitable manner.

A line 84 is secured to the upper edge of the opening 83, and is secured upon the opposite frame log 10. A line 85 is secured to the lower edge of the entrance opening 83, and extends downward to a pulley 86, and thence up to the log 10. When the spiller is to be raised the mouth of the tunnel 8 may be raised to the surface first. The spiller may then be raised by means of the lines 61 passing about the windlasses 63, and the fish transferred to the boat or scow. Due to the novel construction of the tunnel 8, the entire spiller may be raised from the water, and will not be held down by the tunnel, as it would be if a single tunnel were employed.

Such a fish trap as this may be used in open water, where there are currents and where the water is rough. The web will remain distended and vertical at all times. The trap may be opened easily for the escape of the fish on Sundays, or other closed seasons. The spillers may be independently operated, with a minimum of effort. The whole device is simple, practical, and easily operated.

What I claim as my invention is:

1. In a fish trap, in combination, a float, cables suspended from the float and outlining the various compartments common to a fish trap, means for positively spacing the cables from the float, webs depending from the float and arranged to form the various compartments of the trap, the lower edge of said web being independent of and spaced above said cables, and means for detachably securing said lower edge of the web to the cable.

2. In a floating fish trap, in combination, a hollow web-spreading strut, an anchor line passing through said strut, means for securing said line at the upper end of the strut, and an anchor upon the free end of the line.

3. In a fish trap, in combination, a float composed of rigid members, said members having sockets cut in their under side, and having a hole cut therethrough from the socket to their upper side, webs depending from said members, means for spacing the upper and lower edges of said webs comprising a hollow strut registering with said hole, a flange upon the outside of said strut at each end, one of said flanges being adapted to seat upon the downwardly-directed face of said socket, and a line passing through said strut and secured at one end upon the float, and its other end being detachably secured to the lower edge of the web.

4. In a fish trap, in combination, a float composed of rigid members, said members having sockets cut in their under side, and having a hole cut therethrough from the socket to the upper side thereof, webs depending from said members, means for spacing the upper and lower edges of said webs comprising a pipe registering with said hole and having a flange fitting upon the upper end of the pipe and adapted to seat upon the downwardly directed face of said socket, and a line passing through said pipe and secured at its upper end upon the float, and detachably secured at its other end to the lower edge of the web.

5. In a fish trap, a lead extending outward from the mouth of the trap, floats placed at intervals thereon and supporting the lead web, a cable depending from said floats and extending below the bottom of the lead web, struts depending from and secured in said floats positively to space said cable from the floats, and means for detachably securing the bottom of said lead web to the cable.

6. In a fish trap, a lead extending outward from the mouth of the trap, floats placed at intervals thereon and supporting the lead web, a cable depending from said floats and extending below the bottom of the lead web, hollow struts depending from and secured in said floats positively to space said cable from the floats, and means for detachably securing the bottom of said lead web to the cable, bridles each having one end secured upon a float, and its other end passing upward through a hollow strut and being secured on the float, and an anchor line secured to said bridle between its ends.

7. In a floating fish trap, means for maintaining the web distended comprising a cable supported from the float and extending below the lower edge of the vertical web, and independent thereof, struts for positively spacing said cable from the float, and means for detachably securing the lower edge of the web to said cable.

8. In a floating fish trap, means for supporting the web comprising a cable extending below the lower edge of the vertical web, means for supporting said cable and the upper edge of the web from the float, a pipe secured in the float and extending downwardly to the cable, a line extending through the pipe and having its upper end secured upon the float, said cable being secured to the lower end of said line near the lower end of the pipe, and means for securing the lower edge of the web to said cable.

9. In a fish trap, in combination, a frame adapted to be floated at the surface, hollow struts depending therefrom, a cable connecting the lower ends of said struts and being supported thereby, a set of anchor lines connected directly with the floating frame, an anchor upon the free end of each of said lines, a second set of anchor lines secured to said first set between their ends and extending upward through the struts to the frame, and means for securing said anchor lines upon the frame.

10. In a fish trap, in combination, a frame adapted to be floated at the surface, hollow struts depending therefrom, a line extending through each strut and having its upper end secured upon the float, a cable extending between the struts and secured to the lower ends of said lines, and being supported thereby, a set of anchor lines connected directly with said first set between their ends and extending upward through the struts to the frame, and means for securing said anchor lines upon the frame.

11. In a fish trap, in combination, a frame adapted to be floated at the surface, hollow struts extending from the frame downwardly, members connecting the lower ends of said struts, webs extending between the surface frame and the members which connect the lower ends of the struts and forming the required compartments of the trap, anchor lines, and bridles connected with the anchor lines and having one side extending direct to the surface frame and the other through the hollow struts to the same frame, whereby both of said lines may be adjusted from the surface.

12. In a floating fish trap, means for supporting the web comprising a cable extending below the lower edge of the vertical web, means for supporting the cable and the upper edge of the web from the float, a spreader pipe secured in the float and extending downwardly to the cable, means for securing said cable to the spreader to space the cable from the float, means for securing the lower edge of the web to the cable, an anchor, a bridle having one end leading to the float, its other end passing through the lower end of the spreader pipe and up to the float, means for securing the ends of said bridle upon the float, and an anchoring line connecting said bridle and said anchor.

13. In a floating fish trap, means for supporting the web comprising a cable extending below the lower edge of the vertical web, means for supporting said cable and the upper edge of the web from the float, a spreader pipe secured in the float and extending downwardly to the cable, a line extending through the pipe, a clamp for securing the upper end of said line upon the float, a ring secured in the lower end of the line near the lower end of the spreader pipe, the cable passing through said ring, a pulley secured to the cable, a downhaul rope secured to the lower edge of the web and passing through the pulley and up to the float, an anchoring line having one end secured to the float near the upper end of the spreader pipe, an anchor secured to its other end, a second anchoring line having one end secured to the first anchoring line, its other end passing through the lower end of the pipe and thence upward through the pipe, and a second clamp for securing the end of the last mentioned line upon the float.

14. In a fish trap, in combination, a floating frame, vertical webs depending therefrom, and having a bottom web joining their lower edges to form a spiller, one of said vertical webs having an entrance opening, a cable, struts for positively spacing said cable from the frame, pulleys secured to the cables between said struts, downhaul ropes secured to the lower edge of the spiller, and passing through the pulleys and up to the float, and uphaul lines secured to the lower edge of the spiller and extending up to the float.

15. In a fish trap, in combination, a frame outlining a pot and a spiller, independent webs depending therefrom to form a pot and a spiller, a tunnel connecting said pot and spiller, said tunnel comprising a pot tunnel secured at its upper edge to the frame, and having its other edges secured in the pot web, and a spiller tunnel outside of the pot tunnel and having its upper edge secured to the opposite side of the frame from the pot tunnel and its edges secured in the spiller web, the free ends of the pot and spiller tunnels being joined within the spiller.

16. In a fish trap, in combination, a pot and a heart having one wall in common, guide cables extending upward and defining a relatively narrow entrance opening in said common wall, and a gate of flexible material mounted upon said guide cables and adapted to be raised to close said entrance opening.

17. In a fish trap, a trough secured in the wall of the heart, and a post pivoted in one end of said trough, said post being secured to the wall of the heart and being adapted to swing away from the trough to permit the egress of fish.

18. In a fish trap, a trough secured in the outer wall of the heart, and a post pivoted by its lower end in said trough, said post being secured to the wall of the heart and being adapted to swing away from the trough to permit the egress of fish.

19. In a fish trap, a frame, a web depending therefrom to form a heart, the outer wall of said heart having a slit therein, a trough secured to one edge of said slit, and a post pivoted by its lower end in said trough and being secured to the other edge of the slit, said post being adapted to swing away from the trough to permit the egress of fish.

Signed at Wrangell, Alaska, this 14th day of August, 1916.

Mr. WALTER J. LARSON.